H. M. BURRELL.
NUT LOCK.
APPLICATION FILED OCT. 11, 1911.
1,024,973.
Patented Apr. 30, 1912.
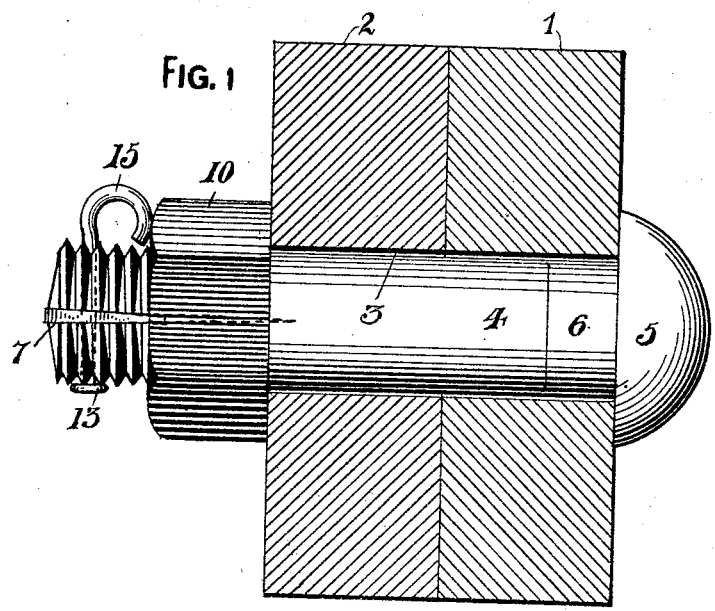
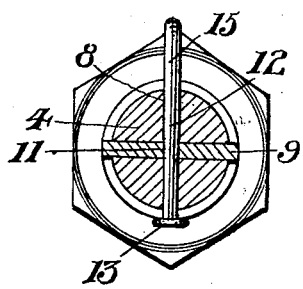
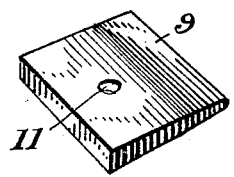
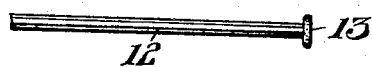
WITNESSES
INVENTOR
Henry M. Burrell
BY
ATTORNEYS

UNITED STATES PATENT OFFICE.

HENRY M. BURRELL, OF PITTSBURGH, PENNSYLVANIA.

NUT-LOCK.

1,024,973.   Specification of Letters Patent.   Patented Apr. 30, 1912.

Application filed October 11, 1911. Serial No. 654,034.

*To all whom it may concern:*

Be it known that I, HENRY M. BURRELL, a citizen of the United States of America, residing at Pittsburgh, in the county of Allegheny and State of Pennsylvania, have invented certain new and useful Improvements in Nut-Locks, of which the following is a specification, reference being had therein to the accompanying drawing.

This invention relates to nut locking devices, and the objects of my invention are to provide positive and reliable means in a manner as will be hereinafter specifically set forth, for locking a nut upon a bolt whereby the nut can not be accidentally displaced, and to provide a nut locking device that can be advantageously used in connection with rail joints, bridges, rolling stock, and structures subjected to vibrations.

Further objects of my invention are to provide a nut locking device consisting of comparatively few parts that are simple and durable, and to accomplish the above results by locking devices that can be installed by unskilled labor and easily removed when it is desired to remove the nut from the bolt.

With the above and other objects in view the invention resides in the novel construction to be hereinafter specifically described and then claimed.

Reference will now be had to the drawing, wherein;—Figure 1 is a side elevation of a nut locking device. Fig. 2 is a cross sectional view of the same. Fig. 3 is a perspective view of a detached wedge, and Fig. 4 is an elevation of a detached malleable pin adapted to form part of the device.

The reference numerals 1 and 2 denote by way of example two pieces of material having registering openings 3 to receive a bolt 4 having a head 5 engaging the piece of material 1 and an oval portion 6 extending into said pieces of material to prevent the bolt from rotating. The threaded end of the bolt protrudes from the piece of material 2 and the threaded end of the bolt is provided with a horizontal slit or slot 7 extending throughout the threaded portion and into the smooth portion of the bolt. The bolt adjacent to the end thereof has a transverse opening 8, said opening intersecting the slot 7.

Mounted in the slit or slot 7 is a wedge 9 adapted to spread the end of the bolt and cause the threads thereof to bind against the threads of a nut 10 screwed upon the bolt prior to driving the wedge in the end of the bolt. The wedge 9 has a central opening 11 and passing through said opening and the opening 8 of the bolt is a malleable pin 12. This pin has a head 13 at one end thereof and the opposite end can be bent, as at 15 to frictionally engage the outer face of the nut 10. The bent end of the pin coöperating with the expanded end of the bolt in retaining the nut 10 upon the bolt and in engagement with the piece of material 2.

It is apparent from the foregoing that the nut 10 can not become displaced and that the nut locking device can be used in connection with various kinds of nuts, it being only necessary to split and aperture the end of the bolt and then provide the wedge and pin for locking a nut upon the bolt.

What I claim is:—

In combination a bolt, provided with a slit extending through the threaded portion and into the smooth portion thereof, said bolt further having in proximity to the outer terminus of its threaded portion a transverse opening intersecting said slit, a nut mounted upon the threaded portion of the bolt, an apertured wedge mounted in the outer portion of the slit of the bolt for expanding the end of the latter and binding the threads of the bolt against the threads of the nut, and a headed malleable pin extending through said opening and through said wedge and bent to frictionally engage the nut, thereby binding the pin in position, said pin constituting means to prevent the slipping out of the wedge.

In testimony whereof I affix my signature in the presence of two witnesses.

HENRY M. BURRELL.

Witnesses:
  H. C. EVERT,
  CHRISTINA T. HOOD.